April 17, 1951     D. W. MOORE, JR     2,549,625
PNEUMATIC TEMPERATURE-RESPONSIVE APPARATUS
Filed Oct. 14, 1947
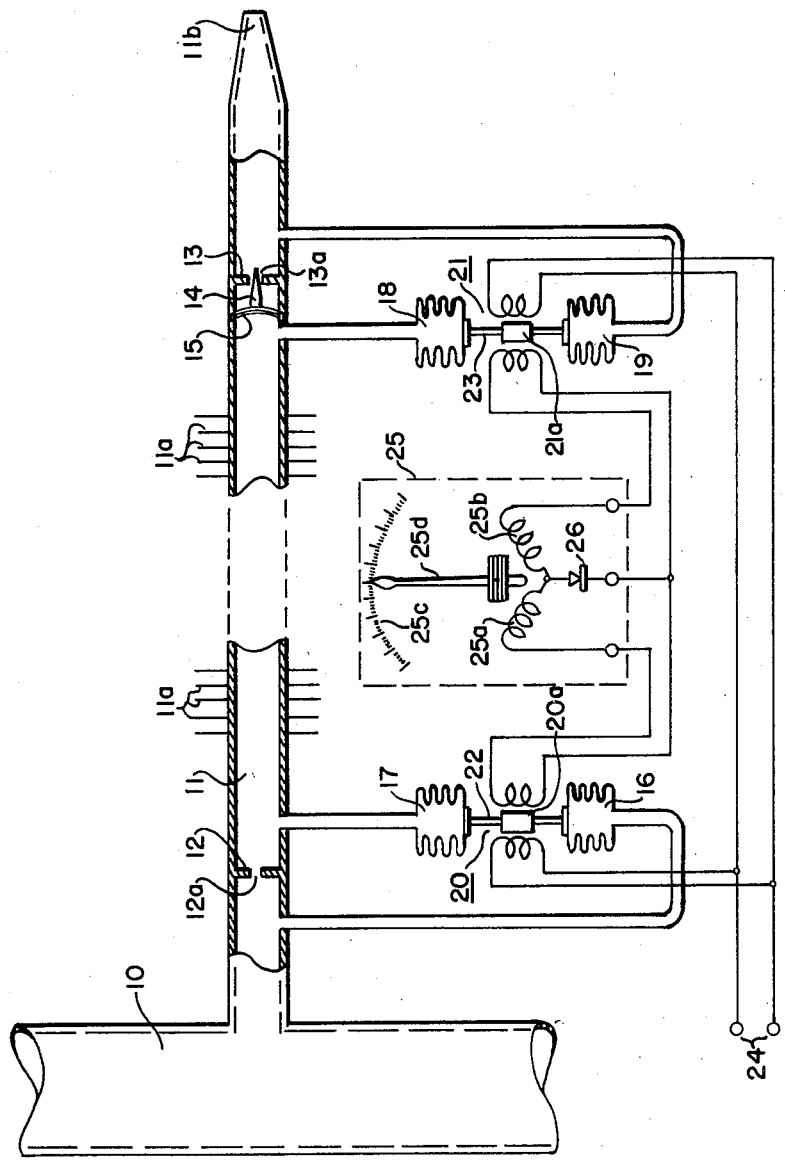
*INVENTOR.*
DAVID W. MOORE, Jr.
BY Laurence B. Dodds
*ATTORNEY*

Patented Apr. 17, 1951

2,549,625

UNITED STATES PATENT OFFICE 2,549,625

PNEUMATIC TEMPERATURE-RESPONSIVE APPARATUS

David W. Moore, Jr., New York, N. Y., assignor to Fairchild Camera and Instrument Corporation, a corporation of Delaware Application October 14, 1947, Serial No. 779,703

9 Claims. (Cl. 73—357)

This invention relates to pneumatic temperature-responsive apparatus and, while it is of general application, is particularly adapted to the measurement of the temperature of an elastic fluid at a temperature so high that ordinary temperature-measuring apparatus is inapplicable; for example, to the measurement of the temperature of the combustion gases in an internal combustion gas turbine.

In applicant's copending application Serial No. 604,867, filed July 13, 1945, entitled "Elastic-Fluid Temperature-Responsive System," assigned to the same assignee as the present application, there is described and claimed a pneumatic temperature-responsive apparatus utilizing the basic principles of Boyle's law, in combination with Gay-Lussac's law or Charles' law, namely, that for any given mass of perfect gas the following equation is satisfied under all conditions of temperature and pressure:

$$PV = RT \qquad (1)$$

where

P = absolute pressure of the gas
V = volume of the gas
T = temperature of the gas
R = the gas constant In the system of that application, if a quantity of high-temperature elastic fluid is extracted from its container, cooled, and a mass-flow factor measured, regulated, or otherwise determined, it is shown that the volumetric flow of the hot gas through a metering orifice, as determined by the differential pressure across such orifice, is representative of the actual temperature of the fluid on a properly calibrated scale.

The present invention represents a simplification of the pneumatic temperature-responsive system of aforesaid copending application in which the necessity for determining the mass flow of the elastic fluid in the conduit is eliminated and there is obtained, by means of simple differential pressure-responsive apparatus, an output effect suitable for indicating, recording, or controlling purposes and representative of the desired temperature factor.

It is an object of the invention, therefore, to provide a new and improved pneumatic temperature-responsive apparatus of the type described in aforesaid copending application in which the means for deriving an output effect representative of the desired temperature factor is considerably simplified.

It is another object of the invention to provide a new and improved pneumatic temperature-responsive apparatus of the type described, in which it is unnecessary to measure, regulate, or otherwise determine the actual fluid-mass flow of the elastic fluid used for measurement.

It is a further object of the invention to provide a new and improved pneumatic temperature-responsive apparatus of the type described, in which the output effect representative of the desired temperature factor is derived from simple differential pressure-responsive apparatus.

In accordance with the invention, a pneumatic apparatus responsive to a temperature factor of a high-temperature elastic-fluid source comprises a conduit in fluid connection with the source, a first constriction in the conduit near the source and a second constriction in the conduit spaced from the source. The conduit includes provisions for cooling the fluid in its passage between the constrictions and there are provided a plurality of means for individually deriving effects representative of the differential pressures across the constrictions and means responsive to the ratio of such effects for developing a third effect representative of the desired temperature factor.

For a better understanding of the present invention, together with other and further objects thereof, reference is had to the following description taken in connection with the accompanying drawing, and its scope will be pointed out in the appended claims.

Referring now to the single figure of the drawing, there is illustrated, partially schematically, a pneumatic temperature-responsive apparatus embodying the invention for measuring the temperature of a high-temperature elastic-fluid source.

Referring now more specifically to the drawing, there is represented a pneumatic apparatus responsive to the temperature of a high-temperature elastic fluid source, such as that in a container 10, which may be a portion of the combustion chamber of an internal combustion gas turbine. This apparatus includes a conduit 11 in fluid connection with the source 10 to conduct a flow of elastic fluid from the container 10. Disposed in the conduit 11 in the vicinity of the source 10 is a plate 12 having a central constriction or orifice 12a through which elastic fluid from the source 10 flows. Spaced from the source 10 in conduit 11 is a second plate 13 having a central constriction or orifice 13a. The conduit 11 includes provisions for cooling the fluid in its passage from the constriction 12a to the constriction 13a. These cooling provisions may comprise merely an extended length of the conduit 11, as indicated by the dotted-line portion or, if desirable, cooling may be effected or supplemented by additional cooling means such as cooling fins 11a, it being preferable that the elastic fluid be cooled substantially to ambient temperature at the orifice 13a. The conduit 11 may be terminated in a discharge nozzle 11b.

The temperature-responsive apparatus of the invention further includes means for maintaining substantially constant the ratio of the fluid temperature at the constriction 13a to the square of the area thereof. If the cooling means described is adequate to maintain the temperature at the constriction 13a constant, this cooling means alone is sufficient as, in such event, the area of the constriction 13a will also remain constant. However, if the temperature of the fluid at the orifice 13a varies to any substantial degree, there may be provided means responsive to the fluid temperature at the constriction 13a for adjusting the area thereof to maintain constant such ratio. For example, there may be provided, as illustrated, an adjustable plug 14 for constriction 13a and means responsive to the fluid temperature at such constriction, for example, a thermostatic element such as a bi-metallic strip 15, disposed in the conduit 11 adjacent the constriction 13a, for adjusting the plug 14 to maintain such ratio substantially constant.

The temperature-responsive apparatus of the invention also includes a plurality of means for individually deriving effects representative of the differential pressures across the orifices 12a and 13a. This means may comprise a pair of differential pressure-responsive devices individually connected across the orifices for deriving displacements representative of the differential pressures thereacross. These devices may be in the form of Sylphon bellows 16 and 17 connected to the high side and low side, respectively, of the orifice 12a, and the Sylphon bellows 18 and 19 connected to the high side and low side, respectively, of the orifice 13a. It is preferable in the design of the orifice plates 12 and 13 to select such sizes of the orifices 12a and 13a that, under normal operating conditions, the pressure drops across the two orifices are equal. When this relationship is followed, the orifice 12a will be considerably larger than the orifice 13a since the hotter gases flowing through the orifice 12a are less dense than those at the orifice 13a and, therefore, travel at higher velocities, resulting in greater differential pressures for a given size of orifice.

The temperature-responsive apparatus of the invention further includes means responsive to the ratio of such effects or displacements for developing a third effect representative of the desired temperature factor. If the temperature at the downstream constriction 13a is maintained substantially constant, this temperature factor becomes the actual temperature of the high-temperature fluid source in the container 10. Specifically, this last-described means includes means responsive to the ratio of the effects or displacements developed by the differential pressure bellows 16, 17 and 18, 19 for developing the desired effect representative of the desired temperature factor. This latter means may be in the form of a pair of electrical pick-off units individually actuated by the pairs of bellows 16, 17 and 18, 19 each effective to develop an alternating-current signal varying with the respective differential pressure. The pick-off units may comprise variable-ratio transformers 20 and 21 having adjustable magnetic core elements 20a and 21a, respectively, attached to links 22 and 23 interconnecting the pairs of bellows 16, 17 and 18, 19, respectively. The primary windings of the transformers 20 and 21 may be energized from any suitable alternating-current supply terminals 24.

The ratio-responsive means further includes a polarized electrical ratio meter 25 having a pair of windings 25a and 25b individually connected to the secondary windings of the variable-ratio pick-off transformers 20 and 21, respectively, through suitable rectifying means. As illustrated, the circuits of the windings 25a and 25b have a common conductor in which is included rectifying means, such as a crystal rectifier 26, so that the windings 25a and 25b are individually energized by the rectified signals developed by the pick-off devices 20 and 21, respectively. The meter 25 is provided with a scale 25c and a cooperating indicator or pointer 25d.

The operation of the above-described temperature-responsive apparatus of the invention may be best understood by considering certain fundamental relationships. As pointed out in the aforesaid copending application, the mass flow of an elastic-fluid flow through an orifice is represented by the equation:

$$W = C_1 A_1 \sqrt{\frac{(P_1 - P_2) P_1}{T_1}} = C_2 A_2 \sqrt{\frac{(P_2 - P_3) P_2}{T_2}} \quad (2)$$

where

W = fluid-mass flow
$A_1$ = effective area of orifice 12a
$A_2$ = effective area of orifice 13a
$P_1$ = high-side pressure at orifice 12a
$P_2$ = low-side pressure at orifice 12a
       high-side pressure at orifice 13a
$P_3$ = low-side pressure at orifice 13a
$T_1$ = temperature of source at orifice 12a
$T_2$ = temperature of fluid at orifice 13a
$C_1, C_2$ = constants, including the gas constant R of the elastic fluid and the orifice constants of the orifices 12a and 13a, respectively.

If it be assumed that the differential pressure across the orifice 12a is small compared to the high-side pressure $P_1$ so that the ratio $P_1/P_2$ is substantially unity, Equation 2 may be transformed to:

$$T_1 = C T_2 \left(\frac{P_1 - P_2}{P_2 - P_3}\right) \left(\frac{A_1}{A_2}\right)^2 \quad (3)$$

If the temperature $T_2$ is maintained substantially constant by the cooling means, such as the fins 11a, and the areas of the orifices 12a and 13a remain constant, Equation 3 becomes:

$$T_1 = C \left(\frac{P_1 - P_2}{P_2 - P_3}\right) \quad (4)$$

On the other hand, the area $A_1$ of orifice 12a is normally constant, assuming negligible thermal expansion and contraction, so that if the ratio $T_2/A_2^2$ is maintained constant Equation 3 still reduces to Equation 4 above. The ratio $T_2/A_2^2$ can be maintained constant by suitable proportioning of the configuration or taper of the plug 14 in relation to the deflection characteristic of the bi-metallic strip 15.

Therefore, if either of the foregoing relations is maintained so that Equation 4 represents conditions in the system, it is seen that the temperature $T_1$ of the elastic-fluid source varies proportionately with the ratio of the differential pressures across the orifices 12a and 13a.

As indicated above, the differential pressure across the orifice 12a is impressed upon the bellows 16, 17 which is effective to adjust the core 20a of the variable-ratio transformer 20 accordingly. Similarly, the differential pressure across the orifice 13a acting through the bellows 18, 19 is effective to adjust the core 21a of the variable-ratio transformer 21. The transformers 20 and 21 are proportioned and designed so that the alternating-current signals developed in their secondary windings vary approximately linearly with the differential pressures impressed upon the bellows 16, 17 and 18, 19. These signals are rectified by the rectifier 26 and energize the windings 25a and 25b, respectively, of the ratio-type polarized electrical meter 25. By proper calibration of the scale 25c, the pointer 25d of the meter may be made to indicate directly the temperature of the high-temperature fluid source in the container 10.

As pointed out above, if the cooling provisions associated with the conduit 11 are sufficient to reduce the temperature at the orifice 13a to a substantially constant value, the compensating plug 14 and bi-metallic strip 15 may be omitted. In such case, any error due to variations in temperature will be a second order effect varying with the square root of the absolute temperature at the orifice 13a.

While there has been described what is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A pneumatic apparatus responsive to a temperature factor of a high-temperature elastic-fluid source comprising: a conduit in fluid connection with said source; a first constriction in said conduit near said source, a second constriction in said conduit spaced from said source; said conduit including provisions for cooling said fluid in its passage between said constrictions; a plurality of means for individually deriving effects representative of the differential pressures across said constrictions; and means responsive to the ratio of said effects for developing a third effect representative of the desired temperature factor.

2. A pneumatic apparatus responsive to the temperature of a high-temperature elastic-fluid source comprising: a conduit in fluid connection with said source; a first constriction in said conduit near said source, a second constriction in said conduit spaced from said source; provisions for maintaining substantially constant the ratio of the fluid temperature at said second constriction to the square of the area thereof; a plurality of means for individually deriving effects representative of the differential pressures across said constrictions; and means responsive to the ratio of said effects for developing a third effect representative of the desired temperature.

3. A pneumatic apparatus responsive to the temperature of a high-temperature elastic-fluid source comprising: a conduit in fluid connection with said source; a first constriction in said conduit near said source, a second constriction in said conduit spaced from said source; means responsive to the fluid temperature at said second constriction for adjusting the area thereof to maintain substantially constant the ratio of such temperature to the square of such area; a plurality of means for individually deriving effects representative of the differential pressures across said constrictions; and means responsive to the ratio of said effects for developing a third effect representative of the desired temperature.

4. A pneumatic apparatus responsive to the temperature of a high-temperature elastic-fluid source comprising: a conduit in fluid connection with said source; a first constriction in said conduit near said source, a second constriction in said condit spaced from said source; an adjustable plug for said second constriction; a thermostatic element disposed in said conduit adjacent said second constriction for adjusting said plug to maintain substantially constant the ratio of the temperature thereat to the square of the area of said second constriction; a plurality of means for individually deriving effects representative of the differential pressures across said constrictions; and means responsive to the ratio of said effects for developing a third effect representative of the desired temperature.

5. A pneumatic apparatus responsive to a temperature factor of a high-temperature elastic-fluid source comprising: a conduit in fluid connection with said source; a first constriction in said conduit near said source, a second constriction in said conduit spaced from said source; said conduit including provisions for cooling said fluid in its passage between said constrictions; a pair of differential-pressure devices individually connected across said constrictions for deriving displacements representative of the differential pressures thereacross; and means responsive to the ratio of said displacements for developing an effect representative of the desired temperature factor.

6. A pneumatic apparatus responsive to a temperature factor of a high-temperature elastic-fluid source comprising: a conduit in fluid connection with said source; a first constriction in said conduit near said source, a second constriction in said conduit spaced from said source; said conduit including provisions for cooling said fluid in its passage between said constrictions; a pair of differential-pressure devices individually connected across said constrictions for deriving electrical signals representative of the differential pressures thereacross; and means responsive to the ratio of said signals for developing an effect representative of the desired temperature factor.

7. A pneumatic apparatus responsive to a temperature factor of a high-temperature elastic-fluid source comprising: a conduit in fluid connection with said source; a first constriction in said conduit near said source, a second constriction in said conduit spaced from said source; said conduit including provisions for cooling said fluid in its passage between said constrictions; a pair of differential-pressure devices individually connected across said constrictions; a pair of electrical pick-off units individually actuated by said devices, each effective to develop an electrical signal varying with the respective differential pressure; and an electrical ratio meter having a pair of windings connected to be individually energized by said signals for giving an indication representative of the desired temperature factor.

8. A pneumatic apparatus responsive to a temperature factor of a high-temperature elastic-fluid source comprising: a conduit in fluid connection with said source; a first constriction in said conduit near said source, a second constriction in said conduit spaced from said source; said conduit including provisions for cooling said fluid in its passage between said constrictions; a pair of differential-pressure devices individually connected across said constrictions; a pair of electrical pick-off units individually actuated by said devices, each effective to develop an electrical signal varying with the respective differential pressure; rectifying means; and a polarized electrical ratio meter having a pair of windings connected to be individually energized by said signals through said rectifying means for giving an indication representative of the desired temperature factor.

9. A pneumatic apparatus responsive to a temperature factor of a high-temperature elastic-fluid source comprising: a conduit in fluid connection with said source; a first constriction in said conduit near said source, a second constriction in said conduit spaced from said source; said conduit including provisions for cooling said fluid in its passage between said constrictions; a plurality of means for individually deriving effects representative of the differential pressures across said constrictions; and means responsive to the ratio of said effects for developing an indication representative of the desired temperature factor.

DAVID W. MOORE, Jr.

REFERENCES CITED

The following references are of record in the file of this patent:

UNITED STATES PATENTS

| Number | Name | Date |
| --- | --- | --- |
| 1,719,067 | Martin | July 2, 1929 |
| 2,103,741 | Bencowitz | Dec. 28, 1937 |
| 2,354,130 | Langer | July 18, 1944 |
| 2,411,712 | De Giers | Nov. 26, 1946 |

FOREIGN PATENTS

| Number | Country | Date |
| --- | --- | --- |
| 504,285 | Great Britain | Nov. 21, 1938 |